(12) United States Patent
Sugahara et al.

(10) Patent No.: US 8,802,040 B2
(45) Date of Patent: Aug. 12, 2014

(54) METHOD FOR EXTRACTING AND SEPARATING LIGHT RARE EARTH ELEMENT

(75) Inventors: Hiroto Sugahara, Echizen (JP); Kazuaki Sakaki, Echizen (JP); Takehisa Minowa, Echizen (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 13/530,672

(22) Filed: Jun. 22, 2012

(65) Prior Publication Data

US 2012/0328493 A1      Dec. 27, 2012

(30) Foreign Application Priority Data

Jun. 27, 2011    (JP) ................ 2011-141570
Jan. 10, 2012    (JP) ................ 2012-001824

(51) Int. Cl.
*C22B 59/00*            (2006.01)

(52) U.S. Cl.
USPC ........................................ 423/21.5

(58) Field of Classification Search
USPC ........................................ 423/21.5
See application file for complete search history.

(56) References Cited

U.S. PATENT DOCUMENTS

| | | | |
|---|---|---|---|
| 2010/0319491 A1* | 12/2010 | Sugahara et al. | 75/743 |
| 2012/0004458 A1* | 1/2012 | Sakaki et al. | 562/567 |
| 2012/0004459 A1* | 1/2012 | Sakaki et al. | 562/567 |
| 2013/0102806 A1 | 4/2013 | Sakaki et al. | |
| 2013/0123534 A1 | 5/2013 | Sakaki et al. | |

FOREIGN PATENT DOCUMENTS

| | | |
|---|---|---|
| EP | 2 264 196 A1 | 12/2010 |
| JP | 2007-327085 A | 12/2007 |
| WO | 2012/005182 A1 | 1/2012 |
| WO | 2012/005183 A1 | 1/2012 |

OTHER PUBLICATIONS

Extended European Search Report dated Nov. 5, 2012, issued in corresponding European Patent Application No. 1217312.9 (7 pages).
Holger, Stephan et al., "Liquid-Liquid Extraction of Metal Ions with Amido Podands", Solvent Extraction and Ion Exchange, Taylor & Francis Group LLC, US, vol. 9, No. 3, Jan. 1, 1991, pp. 459-469, XP008157386, (Cited in Extended European Search Report dated Nov. 5, 2012).
Shimojo, K. et al. "Extraction Behaviour and Separation of Lanthanides with a Diglycol Amic Acid Derivative and a Nitrogen-donor Ligand", Analytical Sciences, Japan Society for Analytical Chemistry, Tokyo, JP, vol. 23, Dec. 1, 2007, pp. 1427-1430, XP002597764, (Cited in Extended European Search Report dated Nov. 5, 2012).
Naganawa, H et al., "A New Green Extractant of the Diglycol Amic Acid Type for Lanthanides", Solvent Extraction Research and Development, Japan, Japanese Association of Solvent Extraction, Saga, JP, vol. 14, Jan. 1, 2007, pp. 151-159, XP002597763, (Cited in Extended European Search Report dated Nov. 5, 2012).
Kubota, Fukiko et al., "Uphill Transport of Rare-Earth Metals through a Highly Stable Supported Liquid Membrane Based on an Ionic Liquid", Analytical Sciences, vol. 26, No. 3, Jan. 1, 2010, pp. 289-290, XP055041580, (Cited in Extended European Search Report dated Nov. 5, 2012).
Kubota, Fukiko et al., "Application of Ionic Liquids to Extraction Separation of Rare Earth Metals with an Effective Diglycol Amic Acid Extractant", Journal Of Chemical Engineering of Japan, vol. 44, No. 5, Jan. 1, 2011, pp. 307-312, XP055041579, (Cited in Extended European Search Report dated Nov. 5, 2012).

* cited by examiner

*Primary Examiner* — Steven Bos
(74) *Attorney, Agent, or Firm* — Westerman, Hattori, Daniels & Adrian, LLP

(57) ABSTRACT

A target light rare earth element is separated from an aqueous solution containing two or more of La, Ce, Pr and Nd by contacting an organic phase containing an extractant with the aqueous solution in a counter-current flow multistage mixer-settler while adding an alkaline solution thereto, and contacting the organic phase with an acid aqueous solution for back-extracting the target element. The extractant is a dialkyl diglycol amic acid having formula: $R^1R^2NCOCH_2OCH_2COOH$ wherein $R^1$ and $R^2$ are alkyl, at least one having at least 6 carbon atoms.

2 Claims, 1 Drawing Sheet

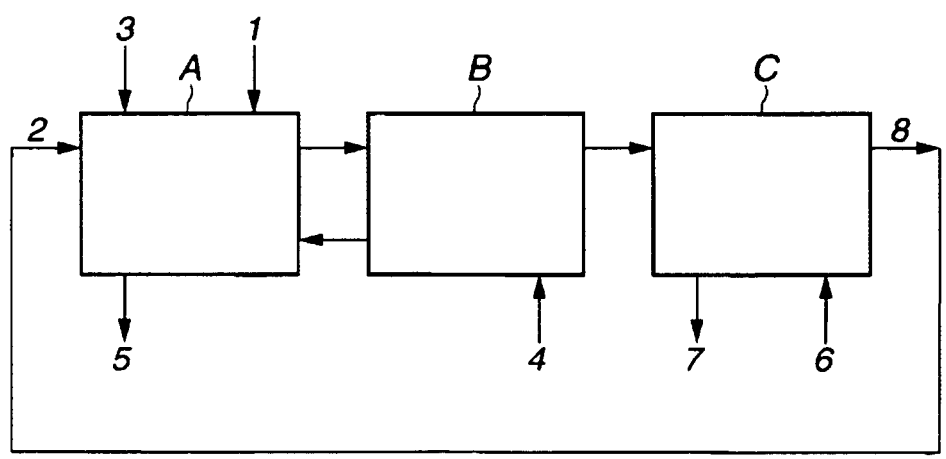

METHOD FOR EXTRACTING AND SEPARATING LIGHT RARE EARTH ELEMENT

CROSS-REFERENCE TO RELATED APPLICATION

This non-provisional application claims priority under 35 U.S.C. §119(a) on Patent Application Nos. 2011-141570 and 2012-001824 filed in Japan on Jun. 27, 2011 and Jan. 10, 2012, respectively, the entire contents of which are hereby incorporated by reference.

TECHNICAL FIELD

This invention relates to a method for effectively extracting and separating a target light rare earth element from a mixture of at least two light rare earth elements including lanthanum, cerium, praseodymium and neodymium.

BACKGROUND ART

Nowadays, rare earth magnets as typified by Nd magnets are widely used in various motors, sensors and other components mounted in hard disk drives, air conditioners, hybrid vehicles, and the like. As to the rare earth elements from which rare earth magnets are manufactured, their resources are found only in limited countries. A resource crisis is exclaimed because it is expected that the demand will exceed the supply in the near future. There is a strong demand for the reuse of magnet powder, debris and scraps associated with the manufacture of rare earth magnets, the recycling by recovery of rare earth elements from municipal wastes, and the research and development of new rare earth mineral deposits.

Most rare earth elements deposited in currently opened mines over the world are light rare earth elements (LREE) include lanthanum (La), cerium (Ce), praseodymium (Pr), and neodymium (Nd). Known techniques for the separation of rare earth elements include ion-exchange resins (solid-to-liquid extraction) and solvent extraction (liquid-to-liquid extraction). For the separation and purification of rare earth elements in an industrial manner, the solvent extraction technique is often used because consecutive steps enable efficient large volume processing.

In the solvent extraction technique, an aqueous phase in the form of an aqueous solution containing metal elements is contacted with an organic phase containing an extractant for a specific metal element and an organic solvent for diluting the extractant, for thereby extracting the specific metal element with the extractant. The specific metal element is separated in this way.

A variety of extractants are used in the art, for example, tributyl phosphate (TBP), carboxylic acid (Versatic acid 10), phosphoric acid esters, phosphonic acid and phosphinic acid. An exemplary phosphoric acid ester is di-2-ethylhexylphosphoric acid (D2EHPA). A typical phosphonic acid is 2-ethylhexylphosphonic acid mono-2-ethylhexyl ester which is commercially available as PC-88A from Daihachi Chemical Industry Co., Ltd. A typical phosphinic acid is bis(2,4,4-trimethylpentyl)phosphinic acid which is commercially available as Cyanex 272 from American Cyanamid. They are commonly used in the industry.

The separation efficiency of the solvent extraction technique depends on the ability of an extractant, especially its separation factor. The greater the separation factor, the higher becomes the separation efficiency of the solvent extraction technique, which leads to simplification of separation steps and downsizing of the separation system, and eventually to improved process efficiency and a cost reduction. Inversely, if the separation factor is lower, the separation process becomes more complicated and the separation system becomes of larger size.

Of the commercially available extractants, even PC-88A which is known to have a high separation factor for rare earth elements has a low separation factor between neighboring elements in the Periodic Table, for example, a separation factor of less than 2, specifically about 1.4 between neodymium and praseodymium which are believed most difficult to separate among the rare earth elements. The separation factor of this order is not sufficient to facilitate separation between neodymium and praseodymium. To purify and separate one from the other at an acceptable purity, a large size system is necessary and capital-intensive. For the purpose of purifying and separating such is rare earth elements, it is desired to have an extractant having a higher separation factor than ever and an extraction/separation method using the same.

One extractant known to have a high separation factor for rare earth elements, especially LREEs: lanthanum (La), cerium (Ce), praseodymium (Pr), and neodymium (Nd) is a diglycol amic acid as disclosed in JP-A 2007-327085. Solvent extraction using this extractant makes more efficient the process of extracting and separating rare earth elements, especially LREEs. However, the extraction process must be further improved before extraction can be implemented at the industrially acceptable level because the diglycol amic acid has different chemical properties from the commercially available extractants, D2EHPA, PC-88A and Cyanex 272.

CITATION LIST

Patent Document 1: JP-A 2007-327085

DISCLOSURE OF INVENTION

An object of the invention is to provide a method for effectively extracting and separating a light rare earth element through simple steps at a commercially acceptable scale and in a small size plant.

The inventors have found that a light rare earth element can be extracted and separated using a dialkyl diglycol amic acid having the general formula (1) defined below as the extractant in a counter-current flow multistage mixer-settler. Although the amounts of alkali and acid used in extraction and back-extraction are smaller than those necessary in the prior art, extraction and separation of the light rare earth element can be implemented through simple steps, in a small size plant, and at a commercially acceptable level of efficiency.

Accordingly, the present invention provides a method for separating a target light rare earth element via solvent extraction from an aqueous solution containing at least two light rare earth elements selected from the group consisting of lanthanum, cerium, praseodymium and neodymium, comprising the steps of contacting an organic phase containing an extractant with an aqueous phase which is the aqueous solution containing at least two light rare earth elements in a counter-current flow multistage mixer-settler while adding an alkaline solution thereto, for extracting the target element into the organic phase, and contacting the organic phase with an acid aqueous solution for back-extracting the target element. The extractant is a dialkyl diglycol amic acid having the general formula (1):

$$R^1R^2NCOCH_2OCH_2COOH \quad (1)$$

wherein $R^1$ and $R^2$ are each independently straight or branched alkyl, at least one being an alkyl group of at least 6 carbon atoms. The amount of alkali in the alkaline solution used in the extracting step and the amount of acid in the acid aqueous solution used in the back-extracting step each are 1.2 to 3.5 equivalents relative to the light rare earth elements in the aqueous phase.

In a preferred embodiment, the extractant is a compound having formula (1) wherein $R^1$ and $R^2$ each are —CH$_2$CH(C$_2$H$_5$)C$_4$H$_9$, that is, di-2-ethylhexyl diglycol amic acid.

ADVANTAGEOUS EFFECTS OF INVENTION

The method enables extraction and separation of a target LREE through simple steps with the advantages of commercially acceptable efficiency, simplicity, and a small size plant. The installation investment and running cost are reduced. The method is of great industrial worth.

BRIEF DESCRIPTION OF DRAWINGS

FIG. 1 is a block diagram of a counter-current flow multistage mixer-settler.

DESCRIPTION OF EMBODIMENTS

According to the invention, a target light rare earth element is extracted and separated from an aqueous solution containing at least two light rare earth elements by contacting an organic phase containing an extractant with an aqueous phase which is the aqueous solution containing at least two light rare earth elements in a counter-current flow multistage mixer-settler while adding an alkaline solution thereto, for extracting the target element into the organic phase, and contacting the organic phase with an acid aqueous solution for back-extracting the target element. The term "light rare earth element" is often abbreviated herein as LREE.

The extractant used herein is a dialkyl diglycol amic acid having the general formula (1).

$$R^1R^2NCOCH_2OCH_2COOH \quad (1)$$

Herein $R^1$ and $R^2$ are each independently a straight or branched alkyl group, and at least one of $R^1$ and $R^2$ is an alkyl group of at least 6 carbon atoms, preferably 6 to 18 carbon atoms, more preferably 7 to 18 carbon atoms.

If the carbon count is less than 6, the compound fails to play the role of extractant because it is less lipophilic so that the organic phase lacks stability and exhibits poor separation from the aqueous phase, and because the dissolution of the extractant itself in aqueous phase becomes noticeable. An excessive carbon count contributes to no improvements in basic abilities like extraction and separation abilities despite the increased cost of extractant manufacture. As long as lipophilic nature is ensured, if one of $R^1$ and $R^2$ has a carbon count of at least 6, then the other may have less than 6 carbon atoms.

The preferred extractant is a dialkyl diglycol amic acid having formula (1) wherein $R^1$ and $R^2$ each are ethylhexyl (—CH$_2$CH(C$_2$H$_5$)C$_4$H$_9$), which is named N,N-dioctyl-3-oxapentane-1,5-amic acid or di-2-ethylhexyl diglycol amic acid (abbreviated as D2EHDGAA, hereinafter).

The organic phase consists essentially of the dialkyl diglycol amic acid as extractant and an organic solvent or diluent in which the extractant is dissolvable. The organic solvent is selected from those which have a low solubility in water, an appropriate solubility of the extractant, and a low specific gravity, and help improve an extraction ability, for example, toluene, xylene, hexane, isododecane, kerosine, and higher alcohols. The concentration of the extractant in the organic phase is preferably 0.1 to 1.5 mol/L, more preferably 0.2 to 1.0 mol/L. Use of the extractant and the organic solvent defined herein ensures treatment of an aqueous solution containing LREEs in a concentration as found in the industrial process.

According to the invention, a target LREE is separated via solvent extraction from an aqueous solution containing at least two LREEs selected from the group consisting of lanthanum (La), cerium (Ce), praseodymium (Pr) and neodymium (Nd). Among the rare earth elements, the LREEs including lanthanum, cerium, praseodymium and neodymium are difficult to separate because the separation factor between neighboring elements in the Periodic Table is low as compared with the other rare earth elements. The present method is quite effective for the extraction and separation of the LREEs.

The LREE mixture to be treated with the extractant is contained in an aqueous phase as aqueous solution. Herein the LREEs may be present in the form of water-soluble salts, for example, chlorides (LaCl$_3$, CeCl$_3$, PrCl$_3$, NdCl$_3$). The aqueous phase containing a mixture of LREEs in a concentration of 0.01 to 0.7 mol/L, more specifically 0.05 to 0.5 mol/L may be treated.

In solvent extraction, the extractability of a rare earth element depends on its ionic radius. Of elements subject to extraction, an element having a smaller ionic radius is preferentially extracted in the organic phase. Therefore, when two neighboring LREEs are subjected to extraction, for example, either one is preferentially extracted.

| Combination | Element extracted in organic phase |
|---|---|
| La/Ce | Ce |
| Ce/Pr | Pr |
| Pr/Nd | Nd |

When extraction is made from a mixture of La, Ce, Pr and Nd, what is first preferentially extracted from the mixture of these four LREEs is Nd, then Pr and Ce are extracted in this order, and finally La is left in the aqueous phase.

In a preferred embodiment, a ratio of an extractant concentration $C_O$ in the organic phase to a LREE concentration $C_A$ in the aqueous phase is in the range: $2 \leq C_O/C_A \leq 10$. If $C_O/C_A < 2$, the concentration of dialkyl diglycol amic acid extractant which is available for a certain LREE concentration is insufficient, resulting in solidification of the organic phase and a failure of solvent extraction to effect separation and purification. A ratio $C_O/C_A$ of higher than 10 does not contribute to improvements in the fundamental functions, extraction and separation abilities, and a higher organic phase concentration relative to an aqueous phase concentration indicates a cost increase.

During the extraction step, the extraction system (combined organic and aqueous phases) is maintained at pH 3 or below. Above pH 3, LREEs tend to form hydroxides which precipitate. This becomes an impediment to extraction and separation when the organic phase is contacted with the aqueous phase. This also results in a failure of phase separation, impeding the extraction step. In the case of strong acidity, undesirably an alkali necessary for extraction and an acid necessary for back-extraction must be used in larger amounts. Therefore, the extraction system (combined organic and aqueous phases) is preferably in a pH range of 1 to 3 during the extraction step.

During the extraction step, the extraction system (combined organic and aqueous phases) is preferably maintained at a temperature lower than the flash point of the solvent in the organic phase. In general, a higher temperature leads to a higher solubility of the extractant in the organic phase and better separation between organic and aqueous phases. However, to prevent a fire from being taken in excess of the flash point, the temperature should not exceed the flash point of the solvent. Preferably the extraction system is controlled to a temperature lower than the flash point by 5° C. to 10° C.

In a preferred embodiment, a counter-current flow multistage mixer-settler is used to effect extraction and separation by effectively contacting the organic phase containing an extractant and an organic solvent with the aqueous phase or aqueous solution containing LREEs.

Referring to FIG. 1, a counter-current flow multistage mixer-settler is schematically illustrated. The mixer-settler illustrated in FIG. 1 includes an extraction section A, a scrubbing section B, and a back-extraction section C, each of which may consist of one or multiple stages. The number of stages in each section is selected so that the desired LREE purity may be obtained at the end of extraction and separation. Lines 1 to 8 depict input and output flows to and from the mixer-settler. The system feeds a LREE aqueous solution (aqueous phase) from line 1, an extractant-containing organic phase from line 2, an alkaline aqueous solution (e.g., sodium hydroxide aqueous solution) from line 3, and an acid aqueous solution (e.g., aqueous hydrochloric acid) from lines 4 and 6. An aqueous phase containing residual LREEs (not extracted in the organic phase) is recovered from line 5, and an aqueous solution in which the target element once extracted in the organic phase is back-extracted (acid aqueous solution) is recovered from line 7. In extracting section A, the pH of the aqueous phase is adjusted in accordance with the type of LREEs so that the target and other elements are separated to the organic and aqueous phases, respectively. In extracting section A, the alkaline aqueous solution from line 3 is added to the organic and aqueous phases in contact. In scrubbing section B, the organic phase is washed to selectively extract only the other elements which are dissolved in minor amounts in the organic phase and which are to be retained in the aqueous phase. Specifically, an acid aqueous solution from line 4 is added to the organic phase in scrubbing section B. In back-extraction section C, the target element once extracted in the organic phase is back-extracted to an acid aqueous solution. Specifically, an acid aqueous solution from line 6 is added to the organic phase in back-extraction section C. The extractant from which the target element has been back-extracted may be recycled from line 8 to line 2 for reuse.

In extraction section A, LREE aqueous solution 1 is contacted with extractant-containing organic phase 2 for extraction. The target element in the LREE solution is extracted into organic phase 2 whereas aqueous phase 5 containing the other LREEs (remaining therein without being extracted into organic phase 2) is discharged and recovered from extraction section A. Understandably, alkaline aqueous solution 3 is fed for the purpose of adjusting to an equilibrium acid concentration. The organic phase 2 to which the target element has been extracted is fed to scrubbing section B where organic phase 2 is washed with acid aqueous solution 4 which is pH adjusted so as to selectively extract only the other elements which are dissolved in minor amounts in the organic phase and which are to be retained in the aqueous phase (e.g., in the case of extraction and separation of Nd/Pr, acid aqueous solution 4 is adjusted to pH 1 to 2 so that Pr may be selectively extracted). The acid aqueous solution 4 to which only the other elements to be retained in the aqueous phase have been selectively extracted is fed back to extraction section A, whereas the washed organic phase 2 is fed to back-extraction section C where the target element in organic phase 2 is back-extracted with acid aqueous solution 6 adjusted to the desired pH. The resultant target element-containing aqueous solution 7 is discharged and recovered. The organic phase 8 from which the target element has been back-extracted may be recycled to extraction section A, as the organic phase 2.

The concentration of the alkaline aqueous solution fed to extraction section A is typically 3 to 6 mol/L though not particularly limited. The concentration of the acid aqueous solution fed to scrubbing section B and the concentration of the acid aqueous solution fed to back-extraction section C are both typically 3 to 6 mol/L though not particularly limited.

Now the equivalent amounts of acid and alkali used in these steps are discussed. Provided that F is an amount of LREEs fed from line 1, R is an amount of LREEs remaining without being extracted into the organic phase, and is a square root of a separation factor of the target element, theoretically the equivalent amount of acid used is given by the formula:

$$3\{R - F(-1)\}/(-1)$$

and the equivalent amount of alkali used is given by the formula:

$$3R/(-1).$$

That is, 3 equivalents of extractant reacts with 1 equivalent of LREE. With respect to solvent extraction of LREE, it is believed in the art that 3 equivalents of acid and alkali are necessary for trivalent LREE ion.

By contrast, the extraction/separation method of the invention is such that the amount of alkali in the alkaline solution used for extraction and the amount of acid in the acid aqueous solution used for back-extraction each may fall in a range of 1.2 to 3.5 equivalents relative to the LREEs in the aqueous phase. The amounts of alkali and acid are preferably at least 1.3 equivalents, and more preferably at least 1.4 equivalents. In the method for extraction and separation in a counter-current flow multistage mixer-settler using a dialkyl diglycol amic acid as extractant, even when the amount of alkali used for extraction and the amount of acid used for back-extraction each are less than 3 equivalents, the number of extraction stages necessary to yield the target element of the same purity is equal to or less than the number of extraction stages necessary for conventional extractants. This suggests a possible reduction of the installation investment. In the extraction/separation method of the invention, the amount of alkali and the amount of acid each may be equal to or less than 2.9 equivalents, preferably equal to or less than 2.4 equivalents, more preferably equal to or less than 2 equivalents, and even more preferably equal to or less than 1.8 equivalents. Since the amounts of alkali and acid used are so small, the extraction/separation method of the invention can reduce the running cost. In addition, since the permissible amount is in a wider range of 1.2 to 3.5 equivalents than in the prior art, the amounts of alkali and acid introduced may be determined with greater acceptability.

EXAMPLE

Experiments and Examples of the invention are given below by way of illustration and not by way of limitation. The concentration of an LREE in an aqueous solution was measured by an ICP atomic emission spectrometer (ICP-7500 by Shimadzu Corp.).

Experiment 1 and Comparative Experiment 1

Pr/Nd Separation Test

An experiment was performed to examine the ability of an extractant to separate LREEs from their mixture. In Experiment 1, D2EHDGAA was dissolved in kerosine in a concentration of 0.5 mol/L to form a solution serving as organic phase. In Comparative Experiment 1, a commercially available extractant, PC-88A was dissolved in kerosine in a concentration of 0.5 mol/L to form a solution serving as organic phase.

Praseodymium chloride and neodymium chloride were dissolved in water to form a mixed LREE solution having a ratio Pr:Nd of 1:1 on a molar basis and a concentration of 0.1 mol/L of Pr+ Nd serving as aqueous phase. A separatory funnel was charged with 100 ml of the organic phase and 100 ml of the aqueous phase, shaken at 20° C. for about 20 minutes to effect extraction, and allowed to stand until equilibrium was reached. The organic phase was then separated from the aqueous phase. Next, 100 ml of the organic phase was fed to a separatory funnel together with 100 ml of 5N hydrochloric acid aqueous solution, which was shaken at 20° C. for about 20 minutes to back-extract the LREE once extracted in the organic phase into the hydrochloric acid aqueous solution.

The concentrations of praseodymium and neodymium in the aqueous phase and the hydrochloric acid aqueous solution after back-extraction were measured by a spectrometer ICP-7500. A separation factor was computed from the concentrations, with the results shown in Table 1. D2EHDGAA had a separation factor of 2.4, and PC-88A had a separation factor of 1.4 under the same conditions. D2EHDGAA displayed definite Nd/Pr separation, surpassing PC-88A.

TABLE 1

|  | Extractant | Extractant concentration (mol/L) | Concentration of mixed LREEs (mol/L) | Separation factor (Nd/Pr) |
|---|---|---|---|---|
| Experiment 1 | D2EHDGAA | 0.5 | 0.1 | 2.4 |
| Comparative Experiment 1 | PC-88A | 0.5 | 0.1 | 1.4 |

Experiment 2 and Comparative Experiment 2

Ce/Pr Separation Test

An experiment was performed to examine the ability of an extractant to separate LREEs from their mixture. In Experiment 2, D2EHDGAA was dissolved in kerosine in a concentration of 0.5 mol/L to form a solution serving as organic phase. In Comparative Experiment 2, a commercially available extractant, PC-88A was dissolved in kerosine in a concentration of 0.5 mol/L to form a solution serving as organic phase.

Cerium chloride and praseodymium chloride were dissolved in water to form a mixed LREE solution having a ratio Ce:Pr of 1:1 on a molar basis and a concentration of 0.1 mol/L of Ce+ Pr serving as aqueous phase. A separatory funnel was charged with 100 ml of the organic phase and 100 ml of the aqueous phase, shaken at 20° C. for about 20 minutes to effect extraction, and allowed to stand until equilibrium was reached. The organic phase was then separated from the aqueous phase. Next, 100 ml of the organic phase was fed to a separatory funnel together with 100 ml of 5N hydrochloric acid aqueous solution, which was shaken at 20° C. for about 20 minutes to back-extract the LREE once extracted in the organic phase into the hydrochloric acid aqueous solution.

The concentrations of cerium and praseodymium in the aqueous phase and the hydrochloric acid aqueous solution after back-extraction were measured by the spectrometer ICP-7500. A separation factor was computed from the concentrations, with the results shown in Table 2. D2EHDGAA had a separation factor of 2.1, and PC-88A had a separation factor of 1.6 under the same conditions. D2EHDGAA displayed definite Ce/Pr separation, surpassing PC-88A.

TABLE 2

|  | Extractant | Extractant concentration (mol/L) | Concentration of mixed LREEs (mol/L) | Separation factor (Ce/Pr) |
|---|---|---|---|---|
| Experiment 2 | D2EHDGAA | 0.5 | 0.1 | 2.1 |
| Comparative Experiment 2 | PC-88A | 0.5 | 0.1 | 1.6 |

Experiment 3 and Comparative Experiment 3

La/Ce Separation Test

An experiment was performed to examine the ability of an extractant to separate LREEs from their mixture. In Experiment 3, D2EHDGAA was dissolved in kerosine in a concentration of 0.5 mol/L to form a solution serving as organic phase. In Comparative Experiment 3, a commercially available extractant, PC-88A was dissolved in kerosine in a concentration of 0.5 mol/L to form a solution serving as organic phase.

Lanthanum chloride and cerium chloride were dissolved in water to form a mixed LREE solution having a ratio La:Ce of 1:1 on a molar basis and a concentration of 0.1 mol/L of La+ Ce serving as aqueous phase. A separatory funnel was charged with 100 ml of the organic phase and 100 ml of the aqueous phase, shaken at 20° C. for about 20 minutes to effect extraction, and allowed to stand until equilibrium was reached. The organic phase was then separated from the aqueous phase. Next, 100 ml of the organic phase was fed to a separatory funnel together with 100 ml of 5N hydrochloric acid aqueous solution, which was shaken at 20° C. for about 20 minutes to back-extract the LREE once extracted in the organic phase into the hydrochloric acid aqueous solution.

The concentrations of lanthanum and cerium in the aqueous phase and the hydrochloric acid aqueous solution after back-extraction were measured by the spectrometer ICP-7500. A separation factor was computed from the concentrations, with the results shown in Table 3. D2EHDGAA had a separation factor of 4.7, and PC-88A had a separation factor of 3.0 under the same conditions. D2EHDGAA displayed definite La/Ce separation, surpassing PC-88A.

TABLE 3

|  | Extractant | Extractant concentration (mol/L) | Concentration of mixed LREEs (mol/L) | Separation factor (La/Ce) |
|---|---|---|---|---|
| Experiment 3 | D2EHDGAA | 0.5 | 0.1 | 4.7 |
| Comparative Experiment 3 | PC-88A | 0.5 | 0.1 | 3.0 |

Example 1

This example used a counter-current flow multistage mixer-settler including sections and flow lines as shown in FIGS. 1, and D2EHDGAA as extractant for extracting and separating neodymium, praseodymium and cerium in sequence from a mixture of lanthanum, cerium, praseodymium and neodymium.

The organic phase was a kerosine solution of 0.5 mol/L of D2EHDGAA. The aqueous phase was 30 L of an aqueous solution of lanthanum chloride, cerium chloride, praseodymium chloride and neodymium chloride in a molar ratio of lanthanum:cerium:praseodymium:neodymium=1:1:1:1 and in a concentration of 0.1 mol/L of lanthanum+cerium+praseodymium+neodymium.

A counter-current flow multistage mixer-settler as shown in FIG. 1 included an extraction section A of 14 stages, a scrubbing section B of 10 stages, and a back-extraction section C of 8 stages. The organic phase and the aqueous phase were contacted for extraction and separation at a temperature of 35° C. which was below the flash point of kerosine. The aqueous phase was fed at a flow rate of 15 L/hr from line 1, the organic phase fed at a flow rate of 10.6 L/hr from line 2, a 4 mol/L sodium hydroxide aqueous solution fed at a flow rate of 0.4 L/hr from line 3, a 5.5 mol/L hydrochloric acid aqueous solution fed at a flow rate of 0.2 L/hr from line 4, and a 5.5 mol/L hydrochloric acid aqueous solution fed at a flow rate of 0.4 L/hr from line 6. The aqueous phase was recovered at a flow rate of 15.6 L/hr from line 5, and the hydrochloric acid aqueous solution containing back-extracted LREE was recovered at a flow rate of 0.2 L/hr from line 7. The amount of sodium hydroxide fed from line 3 was 1.5 equivalents, and the total amount of hydrochloric acid fed from lines 4 and 6 was 1.5 equivalents, relative to the LREEs in the aqueous phase fed from line 1.

After the steady state was reached, the aqueous phase recovered from line 5 and the hydrochloric acid aqueous solution recovered from line 7 were analyzed by the spectrometer ICP-7500 to determine the concentrations of lanthanum, cerium, praseodymium and neodymium. The hydrochloric acid aqueous solution recovered from line 7 contained neodymium in a concentration of 0.024 mol/L and a purity of 99.5 mol % based on the LREEs [Nd/(La+ Ce+Pr+ Nd)], whereas the aqueous phase recovered from line 5 contained neodymium in a concentration of 0.5 mol % based on the LREEs [Nd/(La+ Ce+Pr+ Nd)].

Next, 30 L of the aqueous phase recovered from line 5 (aqueous phase containing lanthanum, cerium and praseodymium in admixture after separation of neodymium) was used as a new aqueous phase.

A counter-current flow multistage mixer-settler as shown in FIG. 1 included an extraction section A of 18 stages, a scrubbing section B of 14 stages, and a back-extraction section C of 8 stages. The organic phase and the aqueous phase were contacted at 35° C. to effect extraction and separation.

In the mixer-settler of FIG. 1, the aqueous phase containing 0.1 mol/L of lanthanum+cerium+praseodymium was fed at a flow rate of 15 L/hr from line 1, the organic phase, 0.5 mol/L of D2EHDGAA in kerosine was fed at a flow rate of 16 L/hr from line 2, a 4 mol/L sodium hydroxide aqueous solution was fed at a flow rate of 0.6 L/hr from line 3, a 5.5 mol/L hydrochloric acid aqueous solution was fed at a flow rate of 0.3 L/hr from line 4, and a 5.5 mol/L hydrochloric acid aqueous solution was fed at a flow rate of 0.5 L/hr from line 6. The aqueous phase was recovered at a flow rate of 15.9 L/hr from line 5, and the hydrochloric acid solution containing back-extracted LREE was recovered at a flow rate of 0.2 L/hr from line 7. The amount of sodium hydroxide fed from line 3 was 1.5 equivalents, and the total amount of hydrochloric acid fed from lines 4 and 6 was 1.5 equivalents, relative to the mixed LREEs in the aqueous phase fed from line 1.

After the steady state was reached, the concentrations of lanthanum, cerium and praseodymium in the aqueous phase recovered from line 5 and the hydrochloric acid solution recovered from line 7 were measured by the spectrometer ICP-7500. The hydrochloric acid solution recovered from line 7 contained praseodymium in a concentration of 0.031 mol/L and a purity of 99.8 mol % of the LREEs [Pr/(La+ Ce+Pr)], whereas the aqueous phase recovered from line 5 contained praseodymium in a concentration of 0.2 mol % of the LREEs [Pr/(La+ Ce+Pr)].

Next, 30 L of the aqueous phase recovered from line 5 (aqueous phase containing lanthanum and cerium in admixture after separation of praseodymium) was used as a new aqueous phase.

A counter-current flow multistage mixer-settler as shown in FIG. 1 included an extraction section A of 8 stages, a scrubbing section B of 8 stages, and a back-extraction section C of 8 stages. The organic phase and the aqueous phase were contacted at 35° C. to effect extraction and separation.

In the mixer-settler of FIG. 1, the aqueous phase containing 0.1 mol/L of lanthanum+cerium was fed at a flow rate of 15 L/hr from line 1, the organic phase, 0.5 mol/L of D2EHDGAA in kerosine was fed at a flow rate of 14 L/hr from line 2, a 4 mol/L sodium hydroxide aqueous solution was fed at a flow rate of 0.5 L/hr from line 3, a 5.5 mol/L hydrochloric acid aqueous solution was fed at a flow rate of 0.2 L/hr from line 4, and a 5.5 mol/L hydrochloric acid aqueous solution was fed at a flow rate of 0.6 L/hr from line 6. The aqueous phase was recovered at a flow rate of 15.7 L/hr from line 5, and the hydrochloric acid solution containing back-extracted LREE was recovered at a flow rate of 0.4 L/hr from line 7. The amount of sodium hydroxide fed from line 3 was 1.5 equivalents, and the total amount of hydrochloric acid fed from lines 4 and 6 was 1.5 equivalents, relative to the mixed LREEs in the aqueous phase fed from line 1.

After the steady state was reached, the concentrations of lanthanum and cerium in the aqueous phase recovered from line 5 and the hydrochloric acid solution recovered from line 7 were measured by the spectrometer ICP-7500. The hydrochloric acid solution recovered from line 7 contained cerium in a concentration of 0.047 mol/L and a purity of 99.9 mol % of the LREEs [Ce/(La+ Ce)], whereas the aqueous phase recovered from line 5 contained lanthanum in a concentration of 0.047 mol/L and a purity of 99.8 mol % of the LREEs [La/(La+ Ce)].

Comparative Example 1

This example used a counter-current flow multistage mixer-settler including sections and flow lines as shown in FIG. 1, and PC-88A as extractant for extracting and separating neodymium, praseodymium and cerium in sequence from a mixture of lanthanum, cerium, praseodymium and neodymium.

The organic phase was a kerosine solution of 0.5 mol/L of PC-88A. The aqueous phase was 30 L of an aqueous solution of lanthanum chloride, cerium chloride, praseodymium chloride and neodymium chloride in a molar ratio of lanthanum:cerium:praseodymium:neodymium=1:1:1:1 and in a concentration of 0.1 mol/L of lanthanum+cerium+praseodymium+neodymium.

A counter-current flow multistage mixer-settler as shown in FIG. 1 included an extraction section A of 38 stages, a scrubbing section B of 26 stages, and a back-extraction section C of 8 stages. The organic phase and the aqueous phase were contacted at 35° C. to effect extraction and separation. The aqueous phase was fed at a flow rate of 15 L/hr from line 1, the organic phase fed at a flow rate of 24 L/hr from line 2, a 4 mol/L sodium hydroxide aqueous solution fed at a flow rate of 1.8 L/hr from line 3, a 5.5 mol/L hydrochloric acid aqueous solution fed at a flow rate of 1.1 L/hr from line 4, and a 5.5 mol/L hydrochloric acid aqueous solution fed at a flow rate of 1.5 L/hr from line 6. The aqueous phase was recovered at a flow rate of 17.9 L/hr from line 5, and the hydrochloric acid aqueous solution containing back-extracted LREE was recovered at a flow rate of 0.4 L/hr from line 7. The amount of sodium hydroxide fed from line 3 was 3 equivalents, and the total amount of hydrochloric acid fed from lines 4 and 6 was 3 equivalents, relative to the LREEs in the aqueous phase fed from line 1.

After the steady state was reached, the aqueous phase recovered from line 5 and the hydrochloric acid aqueous solution recovered from line 7 were analyzed by the spectrometer ICP-7500 to determine the concentrations of lanthanum, cerium, praseodymium and neodymium. The hydrochloric acid aqueous solution recovered from line 7 contained neodymium in a concentration of 0.02 mol/L and a purity of 99.5 mol % based on the LREEs [Nd/(La+ Ce+Pr+ Nd)], whereas the aqueous phase recovered from line 5 contained neodymium in a concentration of 0.5 mol % based on the LREEs [Nd/(La+ Ce+Pr+ Nd)].

Next, 30 L of the aqueous phase recovered from line 5 (aqueous phase containing lanthanum, cerium and praseodymium in admixture after separation of neodymium) was used as a new aqueous phase.

A counter-current flow multistage mixer-settler as shown in FIG. 1 included an extraction section A of 22 stages, a scrubbing section B of 18 stages, and a back-extraction section C of 8 stages. The organic phase and the aqueous phase were contacted at 35° C. to effect extraction and separation.

In the mixer-settler of FIG. 1, the aqueous phase containing 0.1 mol/L of lanthanum+cerium+praseodymium was fed at a flow rate of 15 L/hr from line 1, the organic phase, 0.5 mol/L of PC-88A in kerosine was fed at a flow rate of 24 L/hr from line 2, a 4 mol/L sodium hydroxide aqueous solution was fed at a flow rate of 1.8 L/hr from line 3, a 5.5 mol/L hydrochloric acid aqueous solution was fed at a flow rate of 1.0 L/hr from line 4, and a 5.5 mol/L hydrochloric acid aqueous solution was fed at a flow rate of 1.5 L/hr from line 6. The aqueous phase was recovered at a flow rate of 17.8 L/hr from line 5, and the hydrochloric acid solution containing back-extracted LREE was recovered at a flow rate of 0.5 L/hr from line 7. The amount of sodium hydroxide fed from line 3 was 3 equivalents, and the total amount of hydrochloric acid fed from lines 4 and 6 was 3 equivalents, relative to the mixed LREEs in the aqueous phase fed from line 1.

After the steady state was reached, the concentrations of lanthanum, cerium and praseodymium in the aqueous phase recovered from line 5 and the hydrochloric acid solution recovered from line 7 were measured by the spectrometer ICP-7500. The hydrochloric acid solution recovered from line 7 contained praseodymium in a concentration of 0.027 mol/L and a purity of 99.1 mol % of the LREEs [Pr/(La+ Ce+Pr)], whereas the aqueous phase recovered from line 5 contained praseodymium in a concentration of 0.9 mol % of the LREEs [Pr/(La+ Ce+Pr)].

Next, 30 L of the aqueous phase recovered from line 5 (aqueous phase containing lanthanum and cerium in admixture after separation of praseodymium) was used as a new aqueous phase.

A counter-current flow multistage mixer-settler as shown in FIG. 1 included an extraction section A of 12 stages, a scrubbing section B of 12 stages, and a back-extraction section C of 8 stages. The organic phase and the aqueous phase were contacted at 35° C. to effect extraction and separation.

In the mixer-settler of FIG. 1, the aqueous phase containing 0.1 mol/L of lanthanum+cerium was fed at a flow rate of 15 L/hr from line 1, the organic phase, 0.5 mol/L of PC-88A in kerosine was fed at a flow rate of 18 L/hr from line 2, a 4 mol/L sodium hydroxide aqueous solution was fed at a flow rate of 1.3 L/hr from line 3, a 5.5 mol/L hydrochloric acid solution was fed at a flow rate of 0.6 L/hr from line 4, and a 5.5 mol/L hydrochloric acid aqueous solution was fed at a flow rate of 1.3 L/hr from line 6. The aqueous phase was recovered at a flow rate of 16.9 L/hr from line 5, and the hydrochloric acid solution containing back-extracted LREE was recovered at a flow rate of 0.7 L/hr from line 7. The amount of sodium hydroxide fed from line 3 was 3 equivalents, and the total amount of hydrochloric acid fed from lines 4 and 6 was 3 equivalents, relative to the mixed LREEs in the aqueous phase fed from line 1.

After the steady state was reached, the concentrations of lanthanum and cerium in the aqueous phase recovered from line 5 and the hydrochloric acid solution recovered from line 7 were measured by the spectrometer ICP-7500. The hydrochloric acid solution recovered from line 7 contained cerium in a concentration of 0.044 mol/L and a purity of 99.9 mol % of the LREEs [Ce/(La+ Ce)], whereas the aqueous phase recovered from line 5 contained lanthanum in a concentration of 0.044 mol/L and a purity of 99.8 mol % of the LREEs [La/(La+ Ce)].

Example 2

This example used a counter-current flow multistage mixer-settler including sections and flow lines as shown in FIGS. 1, and D2EHDGAA as extractant for extracting and separating neodymium from a mixture of praseodymium and neodymium.

The organic phase was a kerosine solution of 0.5 mol/L of D2EHDGAA. The aqueous phase was 30 L of an aqueous solution of praseodymium chloride and neodymium chloride in a molar ratio of praseodymium:neodymium=1:1 and in a concentration of 0.1 mol/L of praseodymium+neodymium.

A counter-current flow multistage mixer-settler as shown in FIG. 1 included an extraction section A of 12 stages, a scrubbing section B of 12 stages, and a back-extraction section C of 8 stages. The organic phase and the aqueous phase were contacted at 35° C. to effect extraction and separation. The aqueous phase was fed at a flow rate of 15 L/hr from line 1, the organic phase fed at a flow rate of 21 L/hr from line 2, a 4 mol/L sodium hydroxide aqueous solution fed at a flow rate of 0.6 L/hr from line 3, a 5.5 mol/L hydrochloric acid aqueous solution fed at a flow rate of 0.3 L/hr from line 4, and a 5.5 mol/L hydrochloric acid aqueous solution fed at a flow rate of 0.3 L/hr from line 6. The aqueous phase was recovered at a flow rate of 15.9 L/hr from line 5, and the hydrochloric acid aqueous solution containing back-extracted LREE was recovered at a flow rate of 0.3 L/hr from line 7. The amount of sodium hydroxide fed from line 3 was 1.2 equivalents, and the total amount of hydrochloric acid fed from lines 4 and 6 was 1.2 equivalents, relative to the LREEs in the aqueous phase fed from line 1.

After the steady state was reached, the concentrations of praseodymium and neodymium in the aqueous phase recovered from line 5 and the hydrochloric acid aqueous solution recovered from line 7 were measured by the spectrometer ICP-7500. The purity of neodymium based on LREEs [Nd/(Pr+ Nd)] in the hydrochloric acid aqueous solution recovered from line 7 and the purity of praseodymium based on LREEs [Pr/(Pr+ Nd)] in the aqueous phase recovered from line 5 are reported in Table 4.

Example 3

Extraction and separation was carried out as in Example 2 except that the flow rate of the sodium hydroxide aqueous solution from line 3 was 0.8 L/hr, the flow rate of the hydrochloric acid aqueous solution from line 4 was 0.4 L/hr, and the flow rate of the hydrochloric acid aqueous solution from line 6 was 0.7 L/hr. The amount of sodium hydroxide fed from line 3 was 1.5 equivalents, and the total amount of hydrochloric acid fed from lines 4 and 6 was 1.5 equivalents, relative to the LREEs in the aqueous phase fed from line 1. The concentrations of praseodymium and neodymium were measured as in Example 2. The purities of praseodymium and neodymium are also reported in Table 4.

Example 4

Extraction and separation was carried out as in Example 2 except that the flow rate of the sodium hydroxide aqueous solution from line 3 was 1.6 L/hr, the flow rate of the hydrochloric acid aqueous solution from line 4 was 0.7 L/hr, and the flow rate of the hydrochloric acid aqueous solution from line 6 was 1.5 L/hr. The amount of sodium hydroxide fed from line 3 was 3 equivalents, and the total amount of hydrochloric acid fed from lines 4 and 6 was 3 equivalents, relative to the LREEs in the aqueous phase fed from line 1. The concentrations of praseodymium and neodymium were measured as in Example 2. The purities of praseodymium and neodymium are also reported in Table 4.

Example 5

Extraction and separation was carried out as in Example 2 except that the flow rate of the sodium hydroxide aqueous solution from line 3 was 1.9 L/hr, the flow rate of the hydrochloric acid aqueous solution from line 4 was 0.9 L/hr, and the flow rate of the hydrochloric acid aqueous solution from line 6 was 1.7 L/hr. The amount of sodium hydroxide fed from line 3 was 3.5 equivalents, and the total amount of hydrochloric acid fed from lines 4 and 6 was 3.5 equivalents, relative to the LREEs in the aqueous phase fed from line 1. The concentrations of praseodymium and neodymium were measured as in Example 2. The purities of praseodymium and neodymium are also reported in Table 4.

Comparative Example 2

Extraction and separation was carried out as in Example 2 except that the flow rate of the sodium hydroxide aqueous solution from line 3 was 0.5 L/hr, the flow rate of the hydrochloric acid aqueous solution from line 4 was 0.2 L/hr, and the flow rate of the hydrochloric acid aqueous solution from line 6 was 0.5 L/hr. The amount of sodium hydroxide fed from line 3 was 1 equivalent, and the total amount of hydrochloric acid fed from lines 4 and 6 was 1 equivalent, relative to the LREEs in the aqueous phase fed from line 1. The concentrations of praseodymium and neodymium were measured as in Example 2. The purities of praseodymium and neodymium are also reported in Table 4.

Comparative Example 3

Extraction and separation was carried out as in Example 2 except that the flow rate of the sodium hydroxide aqueous solution from line 3 was 2.1 L/hr, the flow rate of the hydrochloric acid aqueous solution from line 4 was 1.0 L/hr, and the flow rate of the hydrochloric acid aqueous solution from line 6 was 2.0 L/hr. The amount of sodium hydroxide fed from line 3 was 4 equivalents, and the total amount of hydrochloric acid fed from lines 4 and 6 was 4 equivalents, relative to the LREEs in the aqueous phase fed from line 1. The concentrations of praseodymium and neodymium were not measured because phase separation did not occur.

TABLE 4

|  | Equivalent of acid and alkali | Nd purity (mol %) | Pr purity (mol %) |
| --- | --- | --- | --- |
| Comparative Example 2 | 1 | 84.2 | 85.3 |
| Example 2 | 1.2 | 99.2 | 99.1 |
| Example 3 | 1.5 | 99.3 | 99.4 |
| Example 4 | 3 | 99.6 | 99.5 |
| Example 5 | 3.5 | 99.4 | 99.5 |
| Comparative Example 3 | 4 | phase separation failure | |

In Comparative Example 2 using 1 equivalent of acid and alkali, Pr and Nd were recovered in an insufficient purity. In Examples 2 to 5 using 1.2 to 3.5 equivalents of acid and alkali, Pr and Nd were recovered in a satisfactory purity of 99.1 mol % or higher. Comparative Example 3 using 4 equivalents of acid and alkali failed in phase separation.

The method for extracting and separating a target LREE from a LREE mixture according to the invention is successful in reducing the number of extraction stages necessary to recover the target LREE with the desired purity, as compared with the prior art method. This suggests a reduction of the installation investment. The amounts of acid and alkali used are reduced as compared with the prior art method, which leads to a reduction of the running cost.

Japanese Patent Application Nos. 2011-141570 and 2012-001824 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for separating a target light rare earth element via solvent extraction from an aqueous solution containing at least two light rare earth elements selected from the group consisting of lanthanum, cerium, praseodymium and neodymium, comprising the steps of contacting an organic phase containing an extractant with an aqueous phase which is the aqueous solution containing at least two light rare earth elements in a countercurrent flow multistage mixer-settler while adding an alkaline solution thereto, for extracting the target element into the organic phase, the extractant being a dialkyl diglycol amic acid having the general formula (1):

$$R^1R^2NCOCH_2OCH_2COOH \tag{1}$$

wherein $R^1$ and $R^2$ are each independently straight or branched alkyl, at least one being an alkyl group of at least 6 carbon atoms, and contacting the organic phase with an acid aqueous solution for back-extracting the target element, wherein the amount of alkali in the alkaline solution used in the extracting step and the amount of acid in the acid aqueous solution used in the back-extracting step each are 1.2 to 2.9 equivalents relative to the light rare earth elements in the aqueous phase.

2. The method of claim 1 wherein the extractant is dioctyl diglycol amic acid having formula (1) wherein $R^1$ and $R^2$ each are —$CH_2CH(C_2H_5)C_4H_9$.

* * * * *